March 23, 1971 K. H. McFARLAND 3,572,091
MECHANICAL STRAIN INDICATOR
Filed Sept. 27, 1968

INVENTOR.
Keith H. McFarland
BY
Attorney

United States Patent Office 3,572,091
Patented Mar. 23, 1971

3,572,091
MECHANICAL STRAIN INDICATOR
Keith H. McFarland, P.O. Box 328,
Los Altos, Calif. 94022
Filed Sept. 27, 1968, Ser. No. 773,693
Int. Cl. G01n 3/00
U.S. Cl. 73—88                                    2 Claims

ABSTRACT OF THE DISCLOSURE

A device and method for measuring, indicating, and recording the strain produced in structural members when subjected to a force. A coupon comprising two thick end pieces and a thinner center membrane which is separated into fibers or ligaments of varying length. When attached to the member to be tested, the strain produced causes rupture of successive fibers starting with the shortest first, the actual strain being established as lying between that existing in the longest fiber to fail and the shortest one to remain whole. Variations in properties of material and geometries utilized and application of appropriate calibration permits determination of such parameters as stress, force, load, pressure, acceleration, torque, temperature, etc.

BACKGROUND OF THE INVENTION

Most existing devices used for sensing or measuring of strain and related parameters in structures, machine members, pressure vessels, and the like utilize applications of electrical and electronic equipment which is attended by high cost of installation and maintenance, cumbersomeness in application and subject to various errors. Sensing devices relying on strictly mechanical properties have been used in the form of coupons affixed to the member to be tested or measured and noting the changes in properties of the former. These, however, have been limited to determination of approach of the fatigue limit or the approach of the safe life of the member. Few existing mechanical devices are capable of a quantitative measurement of the actual strain, and consequently stress and related parameters, existing in a member without regard to the design limits of said member. Such devices as do exist are bulky, cumbersome and inexact. Consequently, of course, existing deivces are not able to indicate, measure, or record such related conditions as force, load, pressure, acceleration, torque, and temperature because of their inability to provide information as to the quantitative values of strain existing at any given time over an appreciable range of conditions.

I have discovered that by using a novel construction of a coupon embodying a plurality of thin fibers or ligaments which form an integral part of two end pieces and attaching the latter to the member, which it is desired to study, and then noting which of the variable length fibers is the last one to fail and conversely the first one not to fail, as set forth more fully below, I am able to get an accurate determination of any of the qualities and parameters which I desire to measure.

SUMMARY

My invention consists essentially of a coupon adapted to be fastened to the member to be measured by welding, adhesive, or other methods, as set forth more fully below. I may use coupons of various configurations, also as set forth below, but basically my coupon has two end pieces which are of relatively thick cross-section and a center area comprised of a plurality of parallel ligaments or fibers of a relatively thin cross-sectional area which are an integral part of the end pieces. In addition to varying the geometry and dimensions of my coupon, I may also vary the matetrials from which it is made thereby permitting a wide range of coverage. After selecting a coupon having the desired properties consistent with the quantities to be measured and attaching it to the surface of the member, I subject the member to the desired conditions, depending on the parameters which it is desired to measure, as mentioned above. The attachment is made in a manner such that elongation of the coupon will cause a rupture of the ligaments, starting with the smallest one first and continuing to some intermediate one. The strain produced is readily determined from the dimensions of the longest ligament to fail and the shortest one to remain intact, lying somewhere intermediate. The accuracy may be increased by increasing the number and finess of ligaments employed. I may calibrate my coupons to read the quantity directly or employ curves and charts to convert to the dependent parameters, also as set forth more fully below.

DESCRIPTION OF A PREFERRED EMBODIMENT

Figure 1:
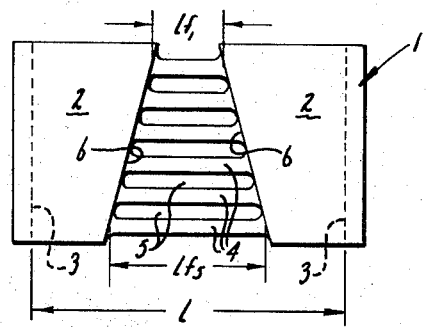
FIG. 1 is a schematic plan view of a preferred embodiment of my invention.

Referring now more particularly to FIG. 1, there is first seen the coupon base or body 1 having end plates 2 of thickness $t_1$. End plates 2 are equipped with raised bosses or pads 3 for fastening my coupon to the member being measured or studied. The central portion of my coupon is subdivided into a plurality of parallel fibers, or ligaments of varying lengths 4, by means of spaces or openings 5. The latter are characterized by rounded corners and edges, as shown in order to prevent concentration of unwanted stresses. The central portion is further characterized by being considerably thinner than the end plates as indicated in $t_2$ for reasons which will be evident from the rest of my description. The variations in lengths of my fibers produces a variation in shape of the end plates or pieces as indicated by contour lines 6.

Figure 2:
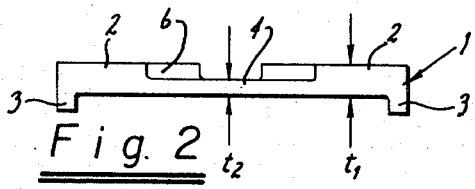
FIG. 2 is an end view of FIG. 1.
Figure 7:
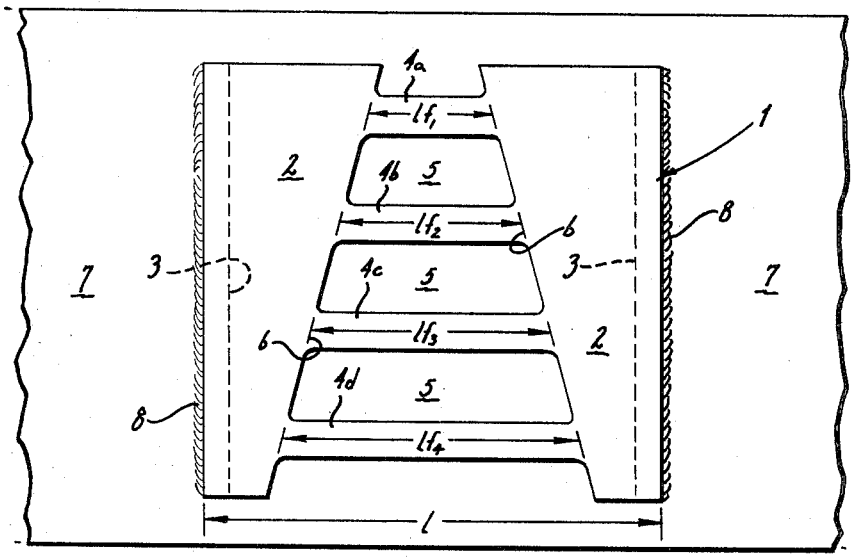
FIG. 7 is a diagrammatical representation of the application of my invention to a member, the strain on which it is desired to measure.

The application of an embodiment similar to that shown in FIG. 1 and FIG. 2 may be better understood by reference to FIG. 7 where the coupon 1 is positioned upon a member 7. The attachment of the coupon to the member indicated schematically at 8 may be by welding, soldering, riveting, adhesives, or any other method depending on the respective materials of 1 and 7, and the range of properties to be studied.

Referring now to FIG. 1 and FIG. 2 again and particularly to the lettered notations thereon, my coupon length may be designed by $l$ as shown. When applied to a member such as 7 of FIG. 7 and when the latter is subjected to tension, the length $l$ will increase an amount which may be designated $l$ as $\Delta l$. The unit strain on a coupon will then be $\Delta l/l$.

The end plates 2 are relatively rigid and hence all the fibers will be elongated an amount equal to $\Delta l$. The unit strain in the longest fiber will be:

$$\Delta l / l f_5$$

and on the shortest fiber $$\Delta l / l f_1$$

The shortest fibers will obviously be subjected to a greater strain and hence stress. Thus if $lf_1$ is one-half of $l$ then the unit strain on $$lf_1 = \frac{\Delta l}{\tfrac{1}{2}l} = \frac{2\Delta l}{l}$$

Thus it is seen that the strain on the smallest fiber will be twice the strain, and hence stress, on the member itself. This strain, and hence stress, will decrease successively as the fibers get longer.

The materials and dimensions of the coupon are selected so that rupture would occur in some of the fibers somewhere within the predetermined range of the quantity to be measured. Thus, referring again to FIG. 7, if the fibers 4a and 4b are ruptured, but 4c remains intact, the actual strain produced in the member 7 will lie somewhere between that produced in 4b and 4c. Coupons having a greater number of fibers may be employed for greater accuracy. Also a series of coupons may be employed adjacent to one another so that if all of the fibers break in one, the second one which would be selected for a higher range, would give the desired reading.

By employing different materials such as silicon or steel I am able to effect ruptures at much smaller stresses while with copper or aluminum I can get into the higher ranges. Composites and even plastics offer even wider ranges.

Of course if it is the temperature of member 7 or other quantity that is desired, it is merely necessary to convert from elongation to temperature applying the appropriate coefficient or modulus in each case.

Figure 3:
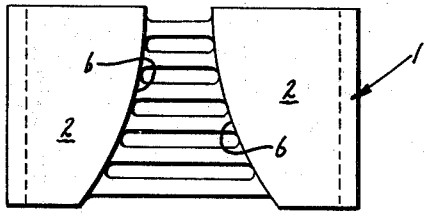

Referring now to FIG. 3 there is seen a variation in lengths of my fibers 4 which produce a contour line 6 curved as shown. With this embodiment I am able to obtain greater sensitivity in the lower ranges of strain since the differences in length between the fibers is less.

Figure 4:
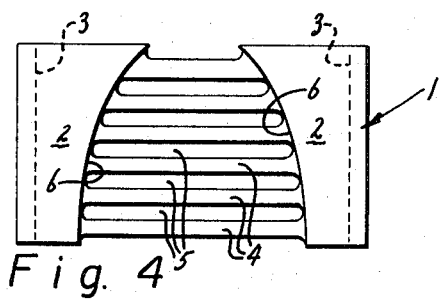
FIGS. 3, 4, 5, and 6 are schematic plan views of alternate embodiments of my invention.

Conversely, referring now to FIG. 4 the differences in lengths of the fibers 4 are less in the higher ranges, as indicated by the contour line 6 and I am consequently able to get greater sensitivity and hence accuracy in this range.

Figure 5:
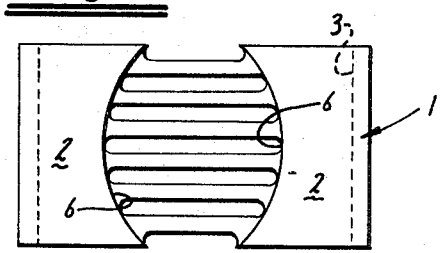
Figure 6:
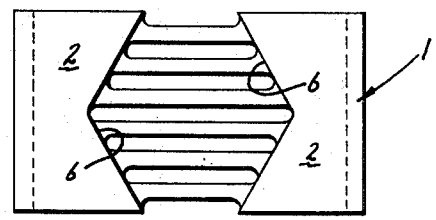

With the embodiments of FIG. 5 and FIG. 6 I duplicate the lengths of fibers at opposite ends providing a dual design and thus a check on the device, one-half of the fibers checking the rupture point of the other half.

The wide versatility, as well as high precision of my method and device by applying the embodiments described above should now be evident to those skilled in the art. I have found, in fact, that I am able to use the device of my invention on such a wide variety of applications ranging from the conditions inside frozen food lockers to components of a jet engine. I have also employed it in the study of movements of foundations during earthquakes, as well as the indication of peak torques in heavy rotating machinery.

I claim:
1. A device for measuring the deformation of an object comprising:
   a plurality of thin parallel fibers of varying lengths;
   end members joining said fibers at opposite ends thereof;
   said end members having a cross-sectional area substantially greater than the total cross-sectional area of all of said fibers;
   means for fastening said end members to the surface of said object.
2. The device of claim 1 in which said fibers form an integral part of said end members.

References Cited
UNITED STATES PATENTS

| | | | |
|---|---|---|---|
| 1,385,473 | 7/1921 | Richards | 73—363 |
| 3,080,748 | 3/1963 | Burkley | 73—88.5 |

JERRY W. MYRACLE, Primary Examiner

U.S. Cl. X.R.

33—147